Feb. 26, 1963 E. I. VALYI ETAL 3,078,527
PRODUCTION OF INGOTS WITH FILLED CORE CHANNELS
Filed Sept. 17, 1959 5 Sheets-Sheet 1

INVENTORS
Emery I. Valyi,
BY Lawrence R. Spann,
Mason, Porter, Diller + Stewart,
ATTORNEYS Feb. 26, 1963 E. I. VALYI ETAL 3,078,527
PRODUCTION OF INGOTS WITH FILLED CORE CHANNELS
Filed Sept. 17, 1959 5 Sheets-Sheet 2

INVENTORS
Emery I. Valyi,
Lawrence R. Spann,
BY
Mason, Porter, Diller & Stewart,
ATTORNEYS INVENTORS
Emery I. Valyi,
Lawrence R. Spann,
BY Mason, Porter, Diller & Stewart,
ATTORNEYS

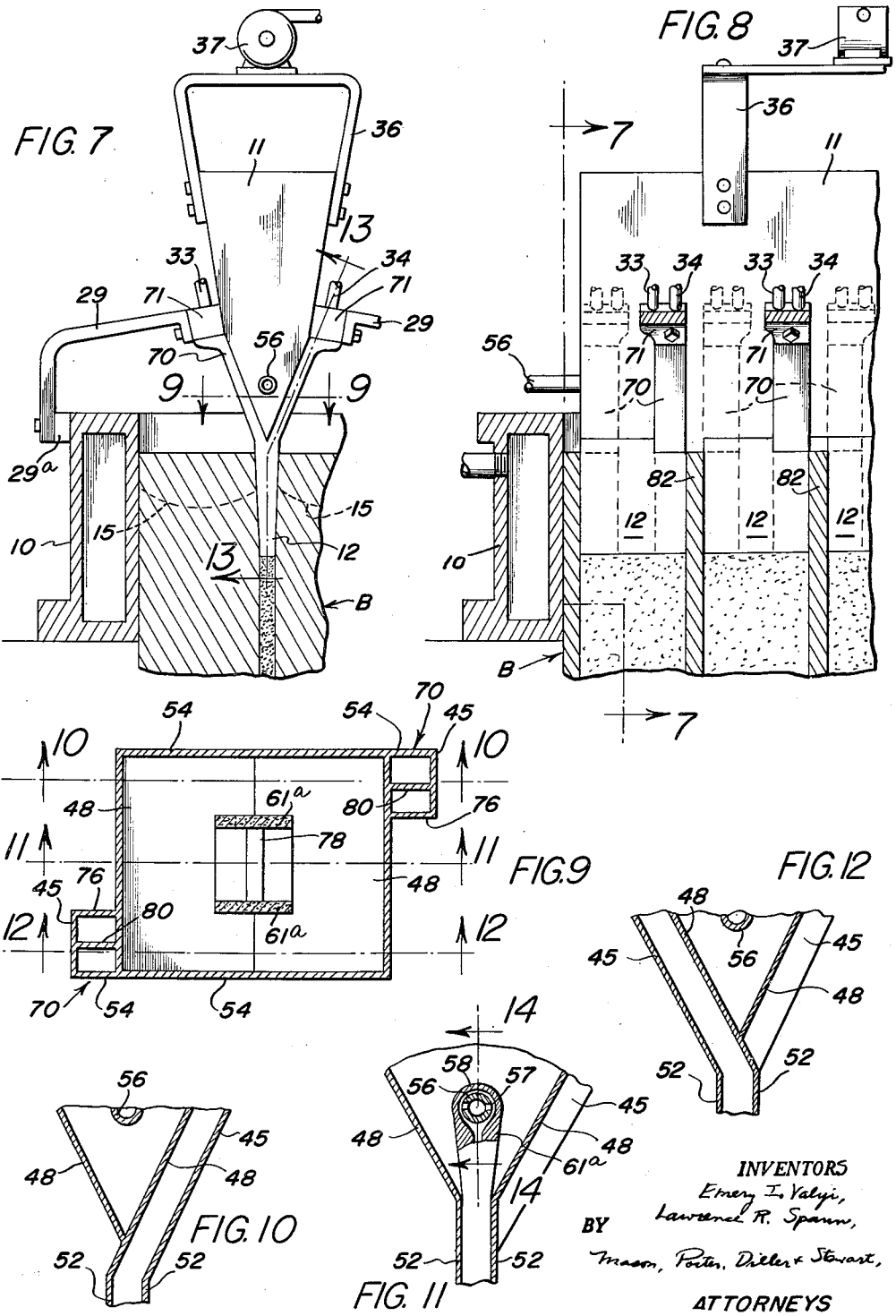

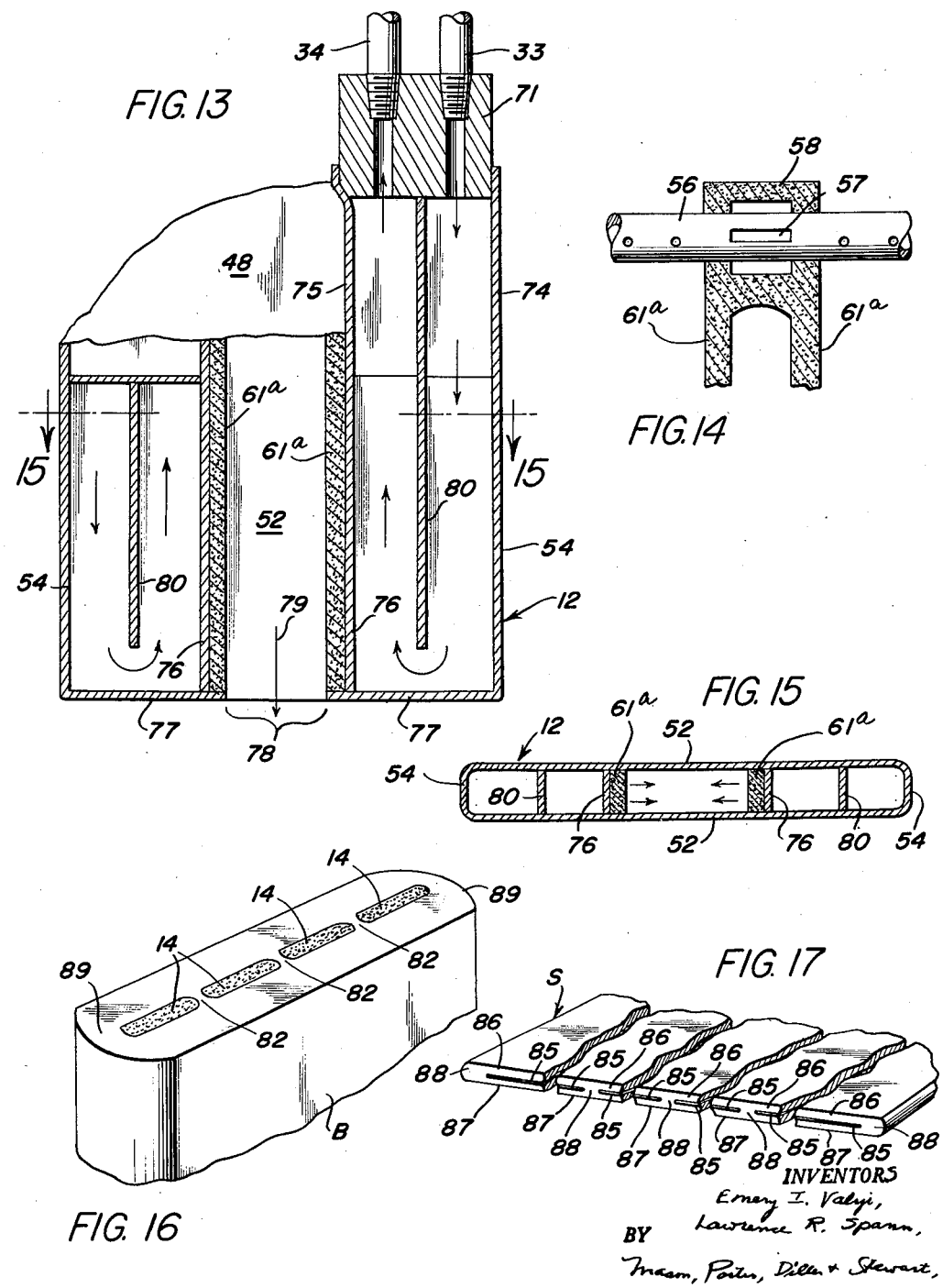

United States Patent Office 3,078,527
Patented Feb. 26, 1963

3,078,527
PRODUCTION OF INGOTS WITH FILLED
CORE CHANNELS
Emery I. Valyi, New York, and Lawrence Richard Spann, Huntington, N.Y., assignors to Continental Can Company, Inc., New York, N.Y., a corporation of New York
Filed Sept. 17, 1959, Ser. No. 840,627
10 Claims. (Cl. 22—57.2)

This invention relates to the production of ingots having channels filled with anti-welding or resist material whereby, upon rolling, the resist material prevents welding of opposed walls of such channels.

It is known for example, in the U.S. Patent 2,375,334, to one of the instant applicants, to provide an ingot with one or more channels which are thereafter charged with such a weld preventing or resist material, and then to roll the ingot and produce a thin strip material having one or more discontinuities formed by the residual layer of the resist material, the strip having metal laminations separated by such discontinuities and being integrally joined, from face to face of the strip, at the edges of each discontinuity. Such material has been called expandable laminate stock strip, because the laminations can be separated or moved apart to form a tube or hollow element.

It is also known to cast ingots in a mold which is open at top and bottom, by employment of a movable platform or stool which at the beginning of a casting operation is in a raised position for closing the bottom of the mold during the entry and solidification of the initial ingot metal, and of a device for lowering the platform in proportion as the molten metal enters the mold top and solidifies therein. Such operations may be semi-continuous as in the so-called "direct chill" or D.C. casting of aluminum and its alloys, in which an ingot 12 or 14 feet long may be made and removed, and then a second ingot made; or such may be continuous, in that the lower part of the ingot is severed and the casting continued. Various apparatus and procedures have been proposed for the purpose, such as that of Junghans-Rossi The present invention is concerned with a process of producing such ingots by substantially continuous operations, in which the molten metal and the resist material are concurrently brought into locating and cooling regions wherewith the ingot is formed with one or more channels and such channels are filled with the resist material prior to the removal of the ingot from the cooling regions.

An object of the invention is the provision of apparatus and process by which the resist material is introduced into the ingot through a region at which the metal is at least in part molten, while being held separate from the metal, and then is deposited into a cored channel having its surface provided by chilled and solidified portions of the ingot metal.

Another object is the provision of apparatus and process by which molten metal is introduced into the top of a mold space which is open at top and bottom, and such metal is cooled and solidified before leaving the bottom of the mold space, and by which a powdery and uncompacted resist material is introduced through a restricted channel into a defined part of the horizontal cross-section of the space and held separate from the metal until at least surface congealing of the metal has occurred at the region to be occupied by the resist material.

A further object is the provision of apparatus and process by which molten metal is introduced into a mold space for congealing therein and with withdrawal of the solidified metal therefrom, and by which a resist material is fed into a restricted channel in the metal, together with employment of vibrations of the solidified metal and of the resist material for effecting a uniform deposition of the resist material.

With these and other objects as features in view, as will appear in the course of the following description and claims, illustrative forms of practicing the invention are shown on the accompanying drawings, in which:

FIG. 7 is a view corresponding to FIG. 3, of a modified resist feeding system, substantially on line 7—7 of FIG. 8;

FIG. 8 is a side elevation of a part of the feeding device of FIG. 7;

FIG. 9 is a top view, substantially on line 9—9 of FIG. 7, of one feeding unit;

FIG. 10 is an upright section, substantially on line 10—10 of FIG. 9;

FIG. 11 is an upright section, substantially on line 11—11 of FIG. 9;

FIG. 12 is an upright section, substantially in line 12—12 of FIG. 9;

FIG. 13 is an upright section, substantially on broken line 13—13 of FIG. 7;

FIG. 14 is a fragmentary upright section, substantially on line 14—14 of FIG. 11;

FIG. 15 is a horizontal section of a core, substantially on line 15—15 of FIG. 13;

FIG. 16 is a perspective view of an ingot thus produced;

FIG. 17 is a perspective view, with parts broken away, of a strip formed by rolling the ingot of FIG. 16.

Figure 1:
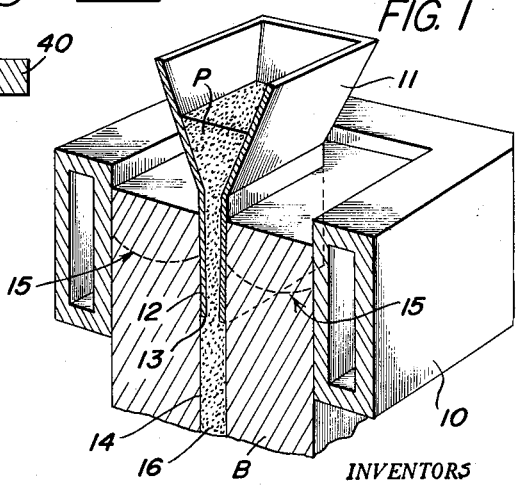
FIG. 1 is a diagrammatic view, in perspective, of an operation according to this invention, with parts in section for clearness.

In FIG. 1, essential parts according to the present invention are shown as an ingot mold 10 in which an ingot B is being cast. A supply of anti-welding or resist powder P is present in a hopper 11 above the mold, with this hopper extending at its lower and discharge end as a hollow core 12 having at its lower end 13 the external shape and size of the desired core channel 14 in the ingot. During relative movement of the ingot and the core 12, the channel 14 is formed in the molten ingot metal above the solidification region which is conventionalized by the dotted lines 15, and the resist powder from the hopper is then delivered into this channel in the solidified part of the ingot B to form the resist-filled discontinuity 16 therein.

It will be understood that an ingot having any desired number of internal discontinuities may be made by providing a corresponding number of cores 12 located at the desired places for such discontinuities and spaced apart to permit the molten metal to flow between them to provide integrating connections or metal spacers between such discontinuities.

Figure 2:
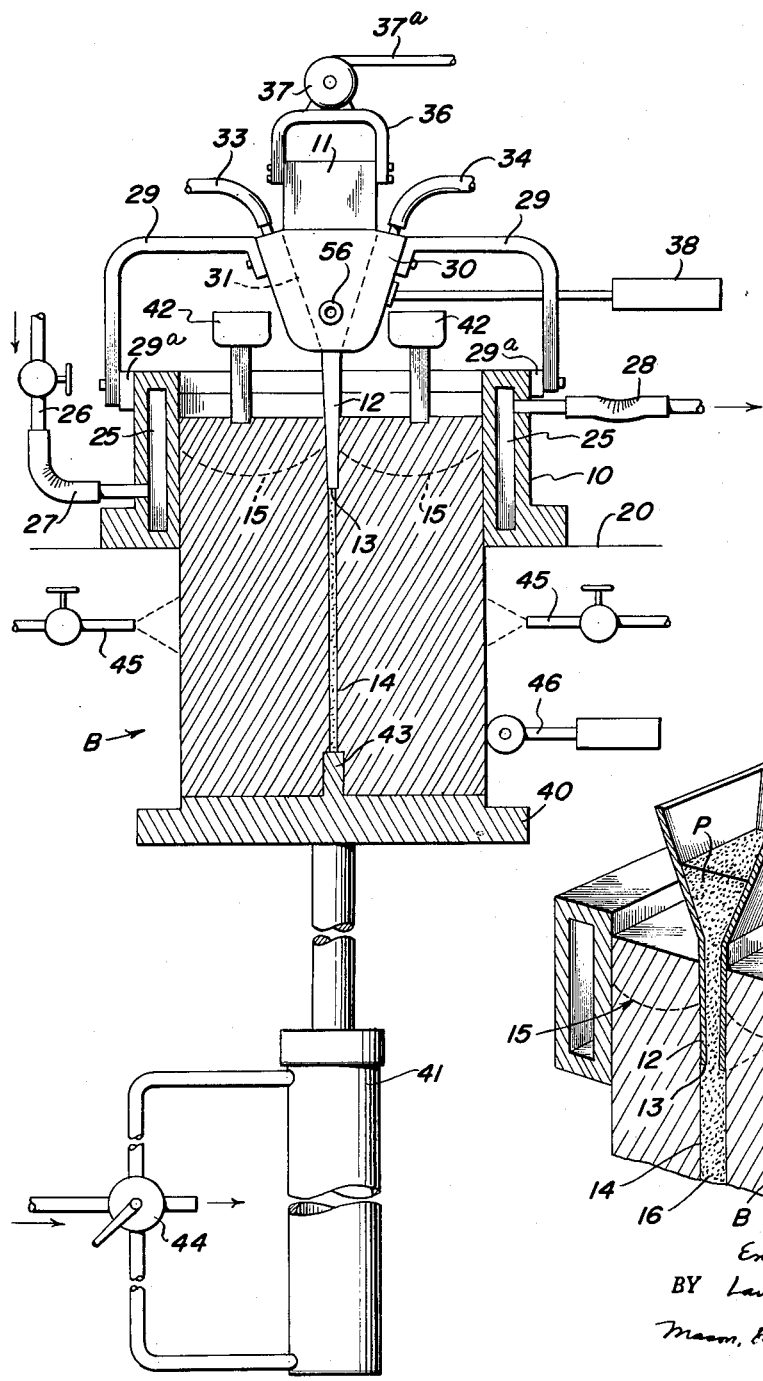
FIG. 2 is a conventionalized upright view of a casting arrangement with metal and ingot handling and cooling devices, and a resist feeding system, according to this invention.

In FIG. 2, parts of a casting apparatus and method are shown, in which ingots of desirable dimensions for rolling can be produced by semi-continuous operations. Supports 20 carry an annular mold 10 having a cored chamber 25 by which it may be cooled, e.g. by the delivery of water from a valved conduit 26 through a flexible connecting duct 27 and with discharge through a flexible duct 28. Brackets 29 support a jacket 30 which encloses the lower convergent end 31 of a hopper 11: flexible conduits 33, 34 provide delivery of cooling water to the space between the jacket and hopper, and the discharge of water therefrom. Such brackets 29 support the hopper 11 and the depending core 12 at the desired position of the core while by their elasticity permitting minor vibratory movement in the vertical and horizontal directions. Vibration dampers 29a, may be employed to permit the vibration of the hopper and core structures, while avoiding movement of the mold. The lower end 12 of the hopper constitutes a core in the ingot mold and has a section corresponding to the size and shape of the resist channel to be formed, and is hollow to provide a passage for delivery of the resist material into a solidified part of the ingot. The upper part of the hopper 11 has a bail 36 on which is a vibrator element 37 which illustratively may be supplied with compressed air by a conduit 37a and thus caused to give vertical impulses to the hopper and jacket. A second vibrator 38 may be employed to produce horizontal vibrations of the hopper structure. These vibrators 37, 38 are used to prevent bridging or irregular stoppage in the feeding of the resist powder from the hopper structure, and to avoid sticking of the core 12 to the ingot being formed.

The horizontal vibrator 38 has a purpose of producing movement of the hopper and core, relative to the powder therein, by a few thousandths of an inch to dislodge the powder from adhesion to the hopper and core walls and assure regular downward flow of the dry powder: preferably the rate of vibration should be resonant for the moving parts and their resilient supports. By construction of the parts and supports, a frequency of 60 cycles per second or a low integer multiple thereof can be employed: e.g. up to 480 cycles per second.

The vertical vibrator 37 also assists in attaining dislodgement of powder and its regular flow; and has effect in preventing sticking of the solidifying metal to the core 12. The movement of the core 12 upward and downward relative to the powder column therein causes the powder to move downward into the channel 14 with a pumping or tamping effect which procures a packing of the powder, noting that air jets, as described hereinafter, are not active in the channel 14 and that the powder can settle and be packed at an essentially uniform density. The amplitude of vibration can be a few thousandths of an inch: and a preferred rate is that at which the column of resist powder and air, above the lower end 13 of the hollow core, is set into vertical vibration, that is, a frequency which is a function of the core material, core length, core suspension, and the density of the powder: air column. With an electrically driven vibrator, the current supply can be from an oscillator acting at a subsonic frequency with a frequency varying control, and passing through an amplifier-wave shaper so that for example a square wave is delivered to the vibrator head. Such electrical devices are known to persons skilled in the electrical arts.

The concurrent employment of vertical and horizontal vibrators is more effective than either alone, for attaining the downward movement of the ingot without a tearing of the tender, hot, just-frozen film of metal at the surface of the hollow core, and for assuring regular delivery and packing of the resist powder into the channel.

At the start of a casting operation, a platform 40 is raised by the hydraulic ram 41 until the platform seals the normally open lower end of the mold 10. Molten metal, of the intended analysis for the ingot, is delivered from tundish channels 42 into the mold space, and solidifies therein to form a solid at the bottom of the mold space and up to a level above the lower end 13 of the core 12: this cooling is attained by having the mold walls cooled by water flow through the conduits 27, 28. It is preferred to have an upward projection 43 on the platform 40, for sealing the lower end or mouth 13 of the core 12 against the delivery of resist powder until the initial molten ingot metal has solidified to provide the beginning of the channel 14 in the solid part of the ingot. The vibrators 37, 38 are started and the platform 40 is lowered at a controlled rate by the ram 41. The powder is thereupon regularly delivered at the lower or delivery end 13 into a region where the metal has already solidified and thus provides a solid sheath around the end of the hopper system so that the resist does not form random occlusions in the molten metal. The core 12 also takes up heat from the surrounding metal, and conducts this heat upward and delivers it to the cooling water within the jacket 30. As molten metal continues to enter, it solidifies adjacent to the mold walls 10 and the core 12, but remains molten at the surface, e.g. as indicated by the dotted lines 15. As the solid metal cools and contracts adjacent the cooling areas, the lower end of the ingot B thus formed frees itself from the mold and is lowered through the bottom of the mold 10 by the sinking platform 40, e.g. by operating the valve 44 so that the ram 41 discharges from its lower end. During this movement, the cooling can be accelerated by the employment of water jets from valved conduits 45. The emerging lower end of the ingot B can be engaged by a third vibrating device 46 which acts to compact the resist powder present in the core channel 14. When the lower end of the ingot approaches the limit of downward movement of the platform 40, the pouring of molten metal from the tundish channels 42 is stopped, and the metal in the mold 10 allowed to solidify. The platform 40 is then lowered, and the solid ingot B removed. The valve 44 is moved, for raising the platform 40 to sealing position; and the operation repeated for a second ingot.

The core 12 is provided with smooth internal and external surfaces so that the resist powder and the ingot can move relative thereto. Stainless steel or anodized aluminum can be employed in forming ingots of aluminum and its alloys, or of other metals having melting points of the same order. The external surface material for the core 12 can be selected for its non-wettability by the molten ingot metal, and for its resistance to fusion at the temperature of such metal during pouring and solidification, noting that the core is being continuously cooled from the jacket 30. The core can be of silicon carbide bonded by silicon nitride in casting aluminum and aluminum alloys. In the form of FIGS. 7–15, copper or aluminum may be employed, preferably with the outer surface treated to prevent adhesions. It is preferred to have the core convergently tapering toward its lower end, by an amount dependent upon the thermal shrinkage of the ingot metal. With aluminum, for example, which has a solidification shrinkage of about 6 percent, the taper in the part of the core which is immersed in molten aluminum can be 7 to 10 degrees, to avoid seizure by the contracting ingot metal, which also compensates for a temperature drop of the solid metal before leaving the core. With aluminum alloys, the taper angle can be less by a factor determined by the specific alloy, noting that such alloys have a lesser solidification shrinkage than the pure metal.

The depth of presentation of the hollow core 12 into the ingot below the molten region is determined by the coordinate rates of supplying molten metal at the top of the mold and the downward withdrawal of solid metal from the bottom of the mold. That is, the cooling of the core 12 must be effective to produce a solid film or layer of the metal which is self-supporting, before the ingot passes the lower core end 13 and begins to receive resist powder. Hence the distance can be adjusted, consonant with the specific mold, the cross-section of the ingot, the metal or alloy being cast, and the temperature and rate of pouring. In general, with a mold 12 inches deep, for casting an aluminum ingot 12 inches thick, the core end 13 can be about 3 inches from the bottom of the mold.

Figure 3:
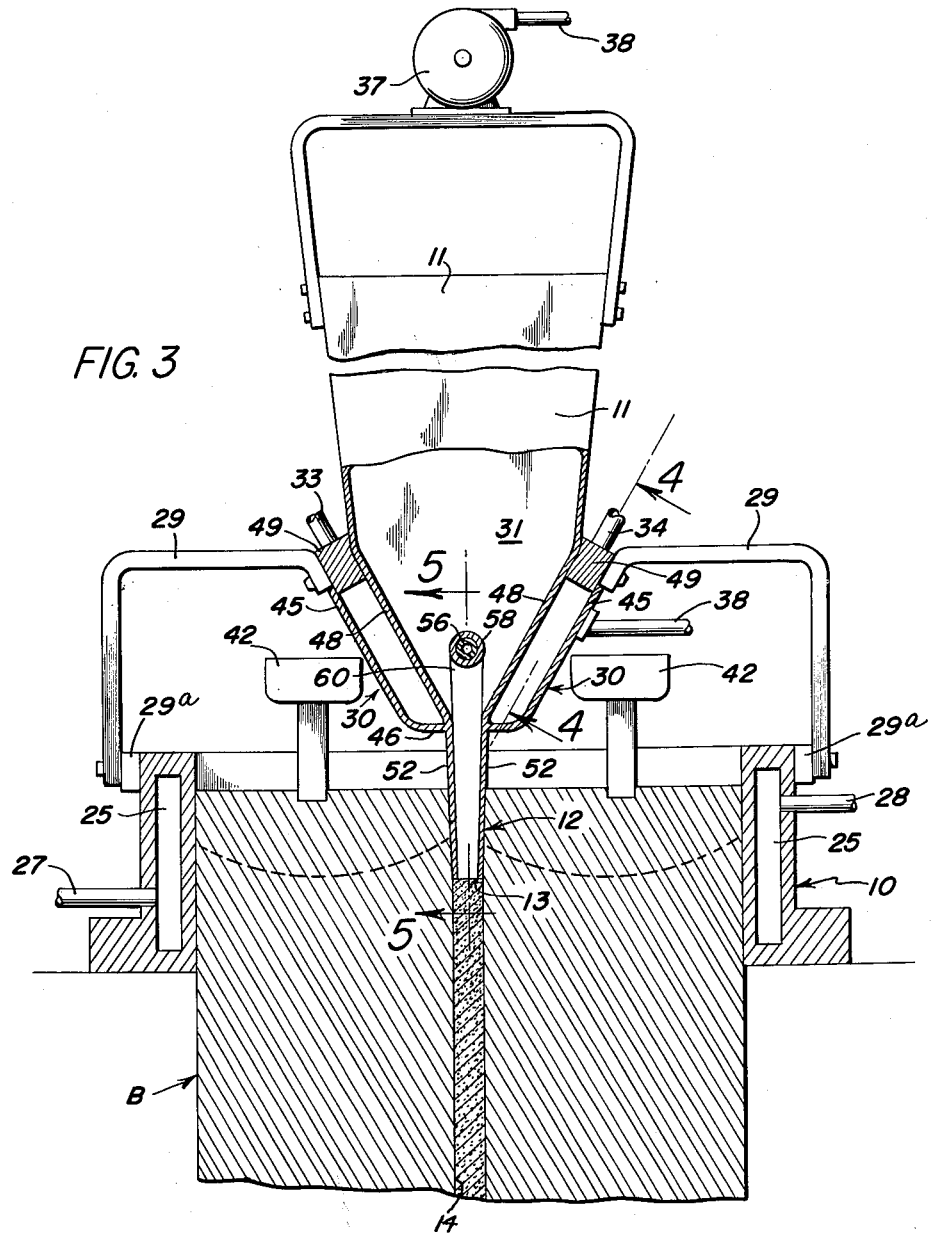
FIG. 3 is an upright section on a greatly enlarged scale over that of FIG. 2, of a part of the casting arrangement and resist feeding system.
Figure 4:
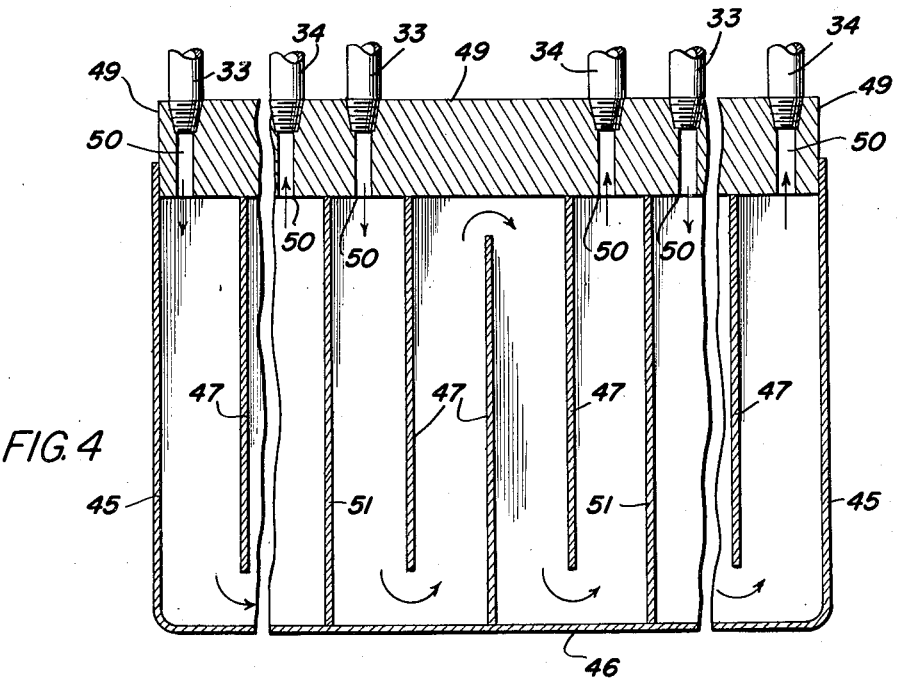
FIG. 4 is an upright section substantially at line 4—4 of FIG. 3, showing cooling devices.

As shown in FIGS. 3 and 4, on larger scales, the jacket 30 can have outer walls 45 and a bottom wall 46 with baffles 47 extending from a wall 45 to the hopper wall 48. The upper end of the jacket is formed by stiffener members 49 having threaded apertures 50 for the ends of the cooling water ducts 33, 34. It is preferred to have intermediate internal walls 51 which divide the jacket space into a number of units, each of which has conduit connections 33, 34, to attain a regular cooling effect along the horizontal extent of the hopper and the core 12. The water circulation is indicated by arrows in FIG. 4.

Figure 6:
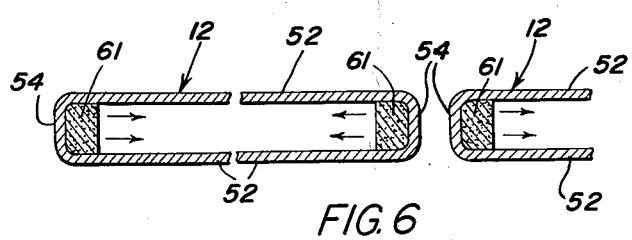
FIG. 6 is a horizontal section through a hollow resist feeding core, substantially on line 6—6 of FIG. 5.
Figure 5:
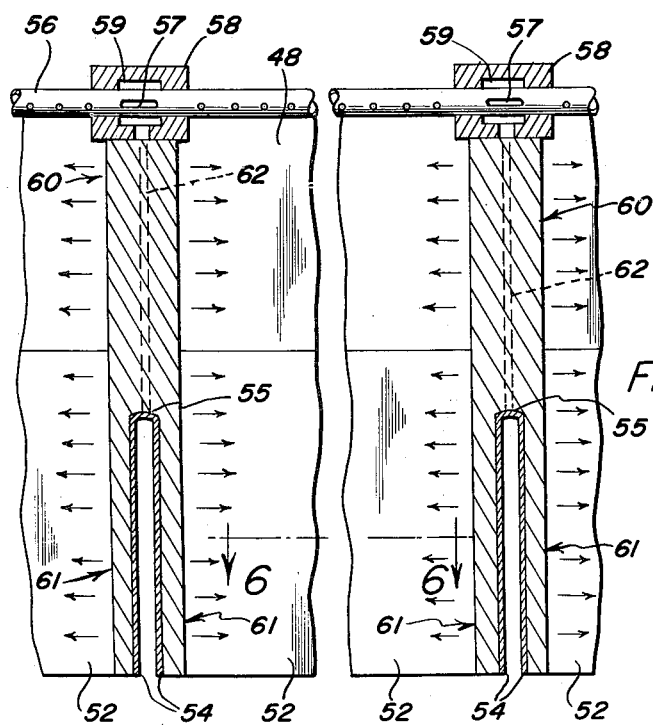
FIG. 5 is a section substantially on line 5—5 of FIG. 3, showing the resist delivery core pieces.

In FIGS. 3 and 5, the lower part of a hopper wall 48 connects smoothly with the wall 52 of the core 12. The wall 52 of each core 12, FIG. 5, is joined to the other wall 52 thereof, FIG. 3, by a transverse wall 54, so that the walls 54 of adjacent cores, with the upper closure 55, provide a space between such hollow cores for the entry of the molten metal to provide integrating connections between the cores. These core walls 52, 54, FIG. 6, form a closed tube for the core 12 so that the resist powder is delivered into the channel in the solid part of the ingot without being discharged into a still fluid part thereof.

A horizontal tube 56 passes along the hopper space (FIGS. 3 and 5) and serves as a fluidizing air pipe. Air free from dust, oil and water is supplied to this tube 56 under a pressure of about 10 pounds per square inch. The tube is below the level of powder in the hopper 11 during operation, preferably being as close to the upper end of the hollow core or cores 12 as will permit downward powder flow past it. The tube may have small orifices for delivery of air jets into the superimposed powder, as an assistance in preventing bridging. Above the inter-core walls 54, 56, this tube has openings 57, and sleeves 58 with internal recesses 59 fit over these openings to receive air therefrom. Connected to the sleeves 58 are dependent bodies 60 of porous metal or ceramic material for conduction of air downward, the bodies having bifurcations 61 at their lower ends to fit within the cores 12, FIG. 6. The bodies 60, 61 are made with greater porosity at their interiors than at their surfaces, so that there is escape of air under pressure throughout their exposed surface areas, with these jets of air, indicated by the arrows in FIGS. 5 and 6, serving to maintain fluidity of the resist powder descending in the hopper and cores, to break up local accumulations and tentative bridges. Such air passes upward in the powder and escapes at the powder surface in the hopper 11. The bodies 60 can have passages 62 therein.

In the form shown in FIGS. 7–14, the hollow cores have cooling passages extending to their lower or discharge ends. Therewith the horizontal section of each core comprises cooling ducts at the ends and a resist powder delivery passage at the center. In general, the casting apparatus of FIG. 2 is illustratively used.

In FIGS. 7 and 8, the mold 10 has brackets 29 to support the hopper 11, and this in turn supports the upper or vertical vibrator 37. The hopper 11 has the depending hollow cores 12, of which three are shown in FIG. 8. In this form, the end walls 54 of the cores may be carried higher into the internal hopper space to form unit lower structures for each core, FIGS. 9–12. Each unit has cooling jackets 70 at the outer face of each wall 48; and these jackets 70 of the several units are spaced, FIGS. 8 and 13, along the length of the hopper. The top closure or stiffener members 71 of the individual jackets have threaded openings for the inlet and outlet cooling water ducts 33, 34. The outer wall 45 of each jacket merges into a part of a core wall 52, FIGS. 10 and 12. The side walls 74, 75 of each jacket are continued downward as the end walls 54 of the core, and as intermediate partition walls 76 thereof, FIGS. 13 and 15. The bottom of each core is closed by the walls 77 which extend from an intermediate wall 76 to the adjacent end wall 54, therewith leaving an opening 78 between the walls 76 for the downward delivery of resist powder as shown by the arrow 79 in FIG. 13. A baffle 80 extends from the member 71 of each cooling jacket downward to near the bottom wall 77 in sealed relation to the walls 45, 48, 52; wherewith a path of water circulation is provided as shown by the arrows in FIG. 13.

A horizontal compressed air pipe 56 (FIGS. 7, 10–12, and 14) has the holes 57 within the recessed sleeves 58 above each core space 78, FIG. 11, from which depend the bifurcations 61a located between and respectively against the intermediate walls 76, being of porous material as before for the delivery of air jets into the powder passage spaces.

In each form of practice, ingots B as shown in FIG. 16 can be produced. The core channels 14, four being illustratively shown, are produced as the molten metal is formed and solidified around the relatively fixed cores 12 and then moves downward therefrom, receiving a filling 16 of resist powder, FIG. 1, as it moves from the lower ends 13 of the cores. Between the channels 14, the ingot has solid integrating or spacer metal 82. The lower end of the ingot has an opening in the residue, FIG. 2, of the core sealing plug 43, which may receive some resist powder from the channel 14. It is preferable to swage this end before re-heating for homogenization and preparatory to the first hot rolling pass; and later to crop this portion of the billet after partial or complete rolling to form the strip. Upon rolling such an ingot, the product is an expandable laminate strip S of which parts are shown in FIG. 17, and which may be termed "multi-wide" because it has the residues of the resist material in the channels of the ingot B of FIG. 16, in the form of thin layers 85 which may be for example 0.001 inch thick and separate the metal laminations 86, 87. The laminations are integrally connected at the edges of the resist layers 85 by the integral spacer metal 88 forming the residue of the spacer metal 82 of the ingot and of the edges 89 of the ingot. The laminations 86, 87 may be moved apart, for example after longitudinal severance of the multi-wide strip along the spacers 88, to form tubes.

The resist powder should be dry, that is, free of moisture, oil and other substances which could act to cause cementing or clumping at the operating temperature. Alumina, zirconia, titania, talc, and other refractory substances can be employed. The powder need not be impalpable in size: for example, sizes of 60 to 300 mesh can be employed in casting and filling aluminum ingots.

It will be understood that the illustrated forms are not restrictive, and that the invention can be practiced in many ways within the scope of the appended claims.

What is claimed is:

1. The method of making an ingot having a powder filled longitudinal core channel, which comprises casting ingot metal into a mold having an upper end with a hollow core extending downward into the same, preparing an agitated mass of powder above the mold and guiding the same into the core for downward movement therein, effecting solidification of the initially cast metal, withdrawing the solidified metal from the bottom of the mold and from the lower end of the core while maintaining solidified metal at the region of the lower end of the hollow core whereby the powder is deposited from the lower end of the core into an ingot channel, filling the channel with powder, and vibrating the solidified metal during the course of its withdrawal whereby to effect deposit of the powder therein as a filling of substantially uniform density.

2. The method as in claim 1, in which the core is vibrated vertically during the casting, with the powder moving downwardly therein.

3. The method as in claim 1, in which air jets are delivered into the descending powder at points adjacent the passage of the powder from the lower end of the core.

4. An apparatus for making an ingot having a powder filled longitudinal core channel, comprising a mold open at its top and bottom, a platform for initially closing the bottom of the mold and means for controlling the downward movement of the platform with the solidified ingot in course of formation thereon, a support extending above the mold, a hopper mounted on the support above the mold and having end walls and convergent side walls, a hollow core mounted on the support and having its upper end in communication with the hopper at the lower ends of said convergent walls to receive powder therefrom, said core extending downwardly into the mold and having an open lower end below the solidification region for cast metal in contact with the core, means for maintaining downward flow of powder from the hopper and through the hollow core into the channel formed in the solidifying metal by the core, means for jetting gas into the powder in the core at levels below the points of communication of the hopper with the hollow core and cooling means located on the hopper.

5. An apparatus as in claim 4, in which the core is provided with closing walls of oblong horizontal section with the outer surfaces thereof exposed to the ingot metal, upright partitions in the core extending between opposed closing walls and providing a passage in which the powder can flow downward to the open lower end of the core, the core having bottom closures between the partitions and the respective ends of the said oblong section for providing cooling chambers, and means for delivering cooling medium to said chambers, said jetting means including a horizontal pipe extending through the hopper end walls above the communication of the hollow core therewith and connections from said pipe for jetting gas into the core space between said partitions.

6. An apparatus for making an ingot having a plurality of powder filled longitudinal core channels located substantially in a plane, comprising a mold open at its top and bottom, a platform for initially closing the bottom of the mold and means for controlling the downward movement of the platform with the solidified ingot in course of formation thereon, a support extending above the mold, a hopper mounted on the support for movement relative to the mold and having downwardly convergent walls, a plurality of hollow cores having opposed walls forming downward extensions of walls of said hopper, said cores extending downwardly in the mold to below the solidification zone thereof, each said core having bodies with gas permeable surfaces located therein, a body of each of two adjacent cores being connected together above the said solidification zone, a gas pipe extending in the hopper adjacent the upper ends of the cores, and means for joining said connected bodies to the gas pipe for the passage of gas into the bodies and through the surface pores thereof into the powder descending in said adjacent cores.

7. An apparatus for making an ingot having a powder filled longitudinal core channel, comprising a mold open at its top and bottom, a platform for initially closing the bottom of the mold and means for controlling the downward movement of the platform with the solidified ingot in course of formation thereon, a support extending above the mold, a hopper mounted on the support above the mold and having convergent walls, a hollow core mounted on the support and having its upper end in communication with the hopper at the lower ends of said covergent walls to receive powder therefrom, said core extending downwardly into the mold and having an open lower end below the solidification region for cast metal in contact with the core, means for maintaining downward flow of powder from the hopper and through the hollow core into the channel formed in the solidifying metal by the core, cooling means located on the hopper, and a gas pipe extending into the hopper adjacent the lower ends of said convergent walls, said pipe having orifices for delivery of gas jets into a powder mass in the hopper adjacent the point of entry into the hollow core for upward flow through said mass.

8. An apparatus as in claim 7, in which a part of the inner surfaces of the hollow core is provided by a body of gas permeable material, and in which the gas pipe is connected to the upper end of the matter for producing gas jets into the powder descending in the hollow core.

9. An apparatus for making an ingot having a plurality of powder filled longitudinal core channels, comprising a mold open at its top and bottom, a platform for initially closing the bottom of the mold and means for controlling the downward movement of the platform with the solidified ingot in course of formation thereon, a support extending above the mold, a hopper mounted on the support above the mold and having convergent walls, a plurality of hollow cores mounted on the support and having their upper ends in communication with the hopper at the lower ends of said convergent walls to receive powder therefrom, said cores extending downwardly into the mold and having open lower ends below the solidification region for cast metal in contact with the cores, means for maintaining downward flow of powder from the hopper and through the hollow cores into the channels formed in the solidifying metal by the cores, cooling means located on the hopper, said cores being tapered convergently downward from the hopper and being spaced apart within the mold, a part of the inner surfaces of each core being provided by a body having a gas permeable surface and a gas duct leading to the pores of said surface, and means for supplying gas under pressure into said gas duct.

10. An apparatus for making an ingot having a powder filled longitudinal core channel, comprising a mold open at its top and bottom, a platform for initially closing the bottom of the mold and means for controlling the downward movement of the platform with the solidified ingot in course of formation thereon, a support extending above the mold, a hopper mounted on the support above the mold and having convergent walls, a hollow core mounted on the support and having its upper end in communication with the hopper at the lower ends of said convergent walls to receive powder therefrom, said core extending downwardly into the mold and having an open lower end below the solidification region for cast metal with the core, means for maintaining downward flow of powder from the hopper and through the hollow core into the channel formed in the solidifying metal by the core, cooling means located on the hopper, the core being provided with closing walls of oblong horizontal section with the outer surfaces thereof exposed to the ingot metal, and bodies extending along the core and located at the ends of the oblong section thereof, said bodies having gas permeable surfaces and ducts for the delivery of gas under pressure to the pores of said surfaces, and cooling means located on the hopper.

References Cited in the file of this patent

UNITED STATES PATENTS

| 867,658 | Hoopes et al. | Oct. 8, 1907 |
| 2,130,202 | Tama | Sept. 13, 1938 |
| 2,237,754 | Davies | Apr. 8, 1941 |
| 2,376,518 | Spence | May 22, 1945 |
| 2,632,205 | Fitz Harris | Mar. 24, 1953 |
| 2,687,553 | Colombo | Aug. 31, 1954 |
| 2,707,813 | Dickson | May 10, 1955 |
| 2,760,229 | Cheney et al. | Aug. 28, 1956 |
| 2,803,533 | Bieniosek et al. | Aug. 20, 1957 |
| 2,811,346 | Spire | Oct. 29, 1957 |

FOREIGN PATENTS

| 866,237 | Germany | Feb. 9, 1953 |
| 902,433 | Germany | Jan. 21, 1954 |

OTHER REFERENCES

Roth et al.: APC 162,538, Apr. 27, 1943.